United States Patent [19]

Maio et al.

[11] Patent Number: 4,972,558
[45] Date of Patent: Nov. 27, 1990

[54] SAFETY HOSE CLAMP

[76] Inventors: David V. Maio; Michelle M. Maio, both of 10 Canterbury Way, Merrimack, N.H. 03054

[21] Appl. No.: 486,304

[22] Filed: Feb. 28, 1990

[51] Int. Cl.$^5$ .............................................. B65D 63/00
[52] U.S. Cl. ..................................... 24/274 R; 24/279
[58] Field of Search ............. 24/274 R, 274 WB, 279, 24/282, 285, 20 R, 20 TT

[56] References Cited

U.S. PATENT DOCUMENTS

| | | | |
|---|---|---|---|
| 519,312 | 5/1894 | Arthur | 24/282 |
| 2,388,674 | 11/1945 | Browne | 24/279 |
| 3,950,830 | 4/1976 | Duprez | 24/274 R |
| 4,468,840 | 9/1984 | Sauer et al. | 24/20 TT |
| 4,473,928 | 10/1984 | Johnson | 24/274 R |
| 4,667,375 | 5/1987 | Enlund | 24/279 |

Primary Examiner—Victor N. Sakran
Attorney, Agent, or Firm—Leon Gilden

[57] ABSTRACT

A safety hose clamp is set forth utilizing a conventional worm gear housing and a worm gear rotatably mounted therethrough for longitudinally directing a forward terminal end of a slotted band through the housing to clamp and enclose a workpiece. The safety hose clamp includes a guide member for maintaining the forward terminal end of the band in contact with the body of the band to minimize obstruction and inadvertent contact of the band with an individual. The guide member may include a single or a plurality of guide loops or may include an elongate arcuate guide loop integrally formed to the housing to maintain and secure the terminal end of the band in predetermined association with the main body of the band. A measurement strip orthogonally mounted at the end of the guide acts as a stop for the terminal end of the band to provide visual indication that an oversized clamp is not utilized on a workpiece of a smaller diameter than the designed clamping range of the clamp structure.

4 Claims, 5 Drawing Sheets

PRIOR ART

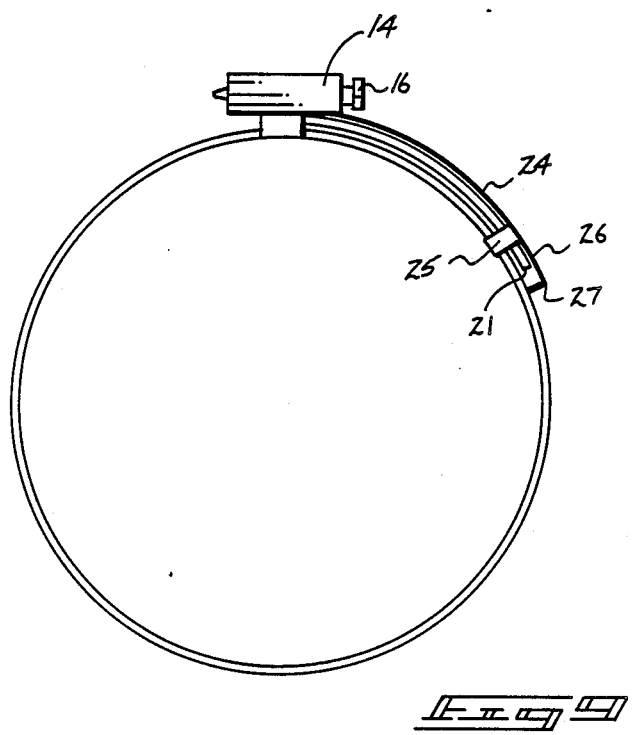
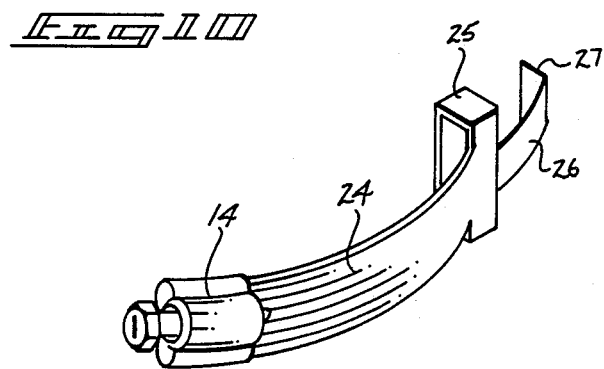

SAFETY HOSE CLAMP

BACKGROUND OF THE INVENTION

1. Field of the invention

The field of the invention relates to hose clamps, and more particularly pertains to a new and improved safety hose clamp wherein the terminal end of the band is secured against the body of the band to prevent inadvertent injury in contact with an individual utilizing the device, and ensures that an individual will utilize the proper clamp size.

2. Description of the Prior Art

The use of hose clamps and their application to various clamping operations is well known in the prior art. The hose clamps of the prior art have utilized a myriad of housing configurations and the like, as well as improvement in the clamping band structure for enhanced use and application in the clamping of various workpieces. Heretofore, however, the prior art has failed to provide an appropriate solution for maintaining the terminal end of the band projecting exteriorly of the worm gear housing from inadvertent contact with individuals and causing safety problems therewith due to the typically sharpened sheet metal-like construction of the band structure. Examples of the prior art include U.S. Pat. No. 3,950,830 to Duprez wherein the band may be temporarily positioned relative to the associated worm gear to enable free travel of the band relative to the worm gear for initial positioning of the band about a workpiece.

U.S. Pat. No. 2,820,276 to Clauss sets forth a clamping band construction formed with an enlarged manually manipulatable head member associated with the worm gear to enhance positioning of the band relative to the worm gear.

U.S. Pat. No. 3,401,437 to Christophersen sets forth a slotted band generally orthogonally oriented relative to the rotatable member to effect displacement of the band relative to the housing of the band clamp.

U.S. Pat. No. 3,797,077 to Omori provides a clamping band utilizing a lever action to secure the band about a workpiece in contra-distinction to conventional worm gear organizations utilized.

U.S. Pat. No. 4,473,928 to Johnson sets forth a conventional band clamp utilizing a backing member laminated to an interior surface of the clamp preventing extrusion of hoses and the like through the slots of the band.

As such, it may be appreciated that there is a continuing need for a new and improved safety hose clamp which addresses both the problems of ease of use as well as effectiveness in construction and in this respect, the present invention substantially fulfills this need. Further, the safety hose clamp addresses the problem of misuse where an oversize clamp is not utilized.

SUMMARY OF THE INVENTION

In view of the foregoing disadvantages inherent in the known types of hose clamps now present in the prior art, the present invention provides a safety hose clamp wherein the same utilizes guide member organizations to maintain a forward terminal end of the clamping band adjacent the main body of the band. As such, the general purpose of the present invention, which will be described subsequently in greater detail, is to provide a new and improved safety hose clamp which has all the advantages of the prior art hose clamps and none of the disadvantages.

To attain this, the present invention includes a slotted elongate band formed with a worm gear housing overlying the band including a worm gear rotatably mounted through the housing to longitudinally extend and retract a forward terminal end portion relative to the housing. The safety hose clamp further includes a guide member organization to maintain the forward terminal end of the band adjacent the main body of the band. Wherein the guide member may include a single or a plurality of loops to maintain the free or terminal end portion of the band adjacent the main body of the band, or alternatively utilize hollow arcuate guide structures to maintain the free portion or the band adjacent the main body of the band wherein the arcuate guide structure is integrally formed relative to the housing clamp. The terminal end of the clamp will abut an integral leg formed as an integral part of the guide structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety hose clamp which has all the advantages of the prior art hose clamps and none of the disadvantages.

It is another object of the present invention to provide a new and improved safety hose clamp which may be easily and efficiently manufactured and marketed.

It is a further object of the present invention to provide a new and improved safety hose clamp which is of a durable and reliable construction.

An even further object of the present invention is to provide a new and improved safety hose clamp which is susceptible of a low cost of manufacture with regard to both materials and labor, and which accordingly is then susceptible of low prices of sale to the consuming public, thereby making such safety hose clamps economically available to the buying public.

Still yet another object of the present invention is to provide a new and improved safety hose clamp which provides in the apparatuses and methods of the prior art some of the advantages thereof, while simultaneously overcoming some of the disadvantages normally associated therewith.

Still another object of the present invention is to provide a new and improved safety hose clamp wherein the same utilizes guide structure to maintain a free end of the clamping band adjacent the main body of the band, and to ensure users of a proper clamp fit onto a workpiece.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an orthographic side view of a fourth embodiment of the safety hose clamp of the instant invention.

FIG. 10 is an isometric illustration of the modified arcuate guide structure utilized by the fourth embodiment of the instant invention.

DESCRIPTION OF THE PREFERRED EMBODIMENT

Figure 1:
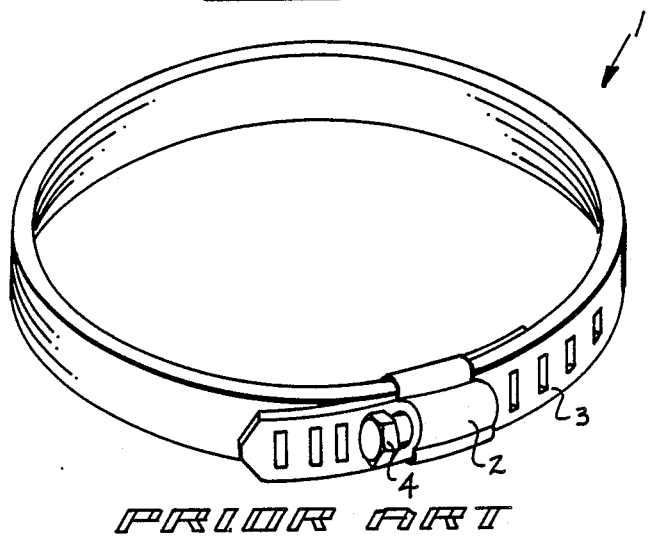
FIG. 1 is an isometric illustration of a prior art clamp.

With reference now to the drawings, and in particular to FIGS. 1 to 10 thereof, a new and improved safety hose clamp embodying the principles and concepts of the present invention and generally designated by the reference numerals 10, 11, 12, and 13 will be described.

Figure 2:
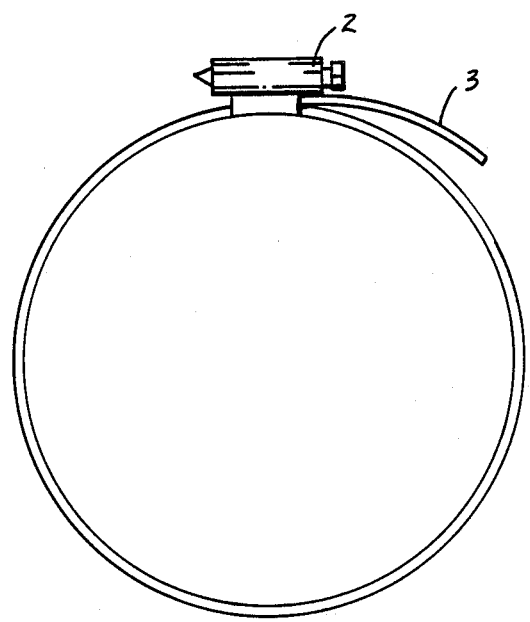
FIG. 2 is an orthographic side view of a prior art clamp.

More specifically, the safety hose clamp 10 of the instant invention essentially comprises an improvement over the prior art, as exemplified by FIGS. 1 and 2, wherein a conventional hose clamp 1 includes a slotted band 3, with a housing 2 mounted thereon including a threaded worm gear 4 rotatably mounted therethrough for 14 extension and retraction of the slotted band 3 relative to the housing 2.

Figure 3:
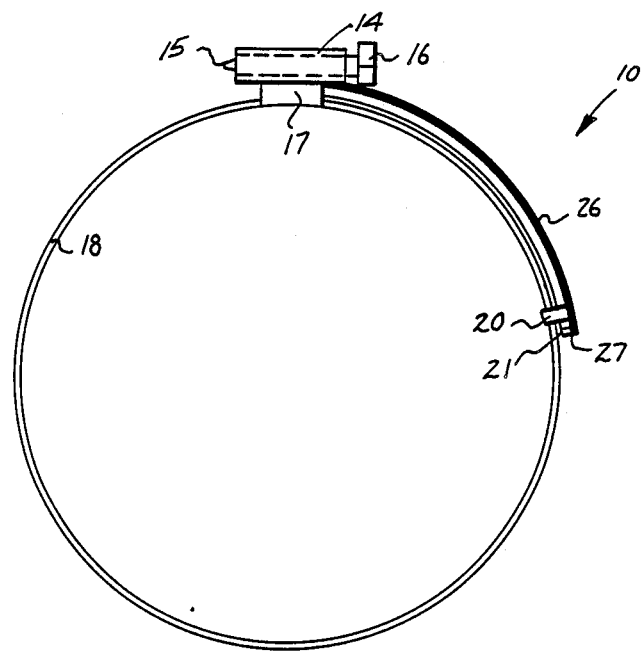
FIG. 3 is an orthographic side view of the safety hose clamp of the instant invention.

The hose clamp 10, as illustrated in FIG. 3, utilizes a housing 14 including a worm screw 15 rotatably mounted therethrough with a slotted head 16 to enable rotation of the worm screw 15 relative to the slotted band 18 with a housing strap 17 underlying the housing 14 and integrally secured to the band 18 to position the housing 14 relative to a rear terminal end of the band 18 in a conventional manner. The slotted band 18 includes equally spaced slots 19 for engagement with the worm screw 15 for extension and retraction of the forward free end 21 relative to the housing 14. The hose clamp 10 includes a slidably movable loop 20 formed with a hollow internal configuration to accommodate twice the cross-section of the band 18 to maintain the band 18 and the terminal end 21 therethrough and confine the free end 21 of the band against the main body of the band 18, as illustrated in FIG. 3. The loop 20 is fixedly mounted onto an arcuate rigid guide strap 26 adjacent a forward terminal end thereof. The forward terminal end of the guide strap 26 includes an abutment leg 27 integrally and orthogonally mounted thereto overlying the band 18. The rear terminal end of the guide strap 26 is fixedly mounted in alignment with a forward end of the housing 14, the leg 27 abuts a forward free end 21 of the band 18 to visually indicate to an individual the forward permissive safe extent of the free end 21 relative to the housing 14.

Figure 4:
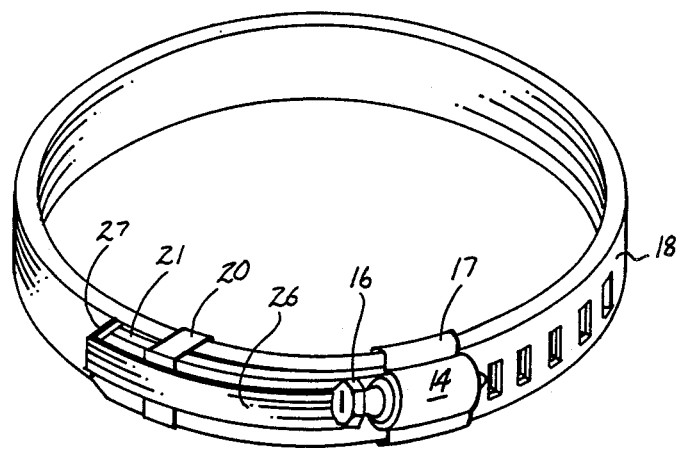
FIG. 4 is an isometric illustration of the safety hose clamp of the instant invention.
Figure 5:
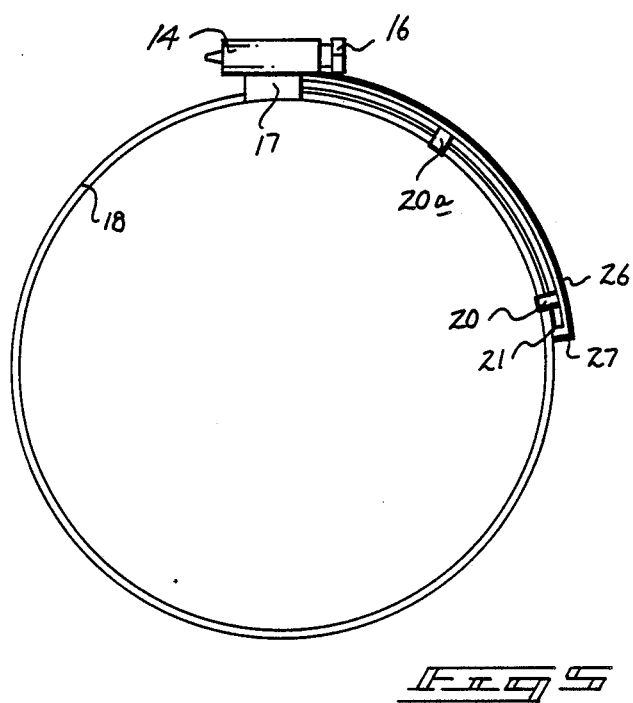
FIG. 5 is an orthographic side view of a second embodiment of the safety hose clamp of the instant invention.
Figure 6:
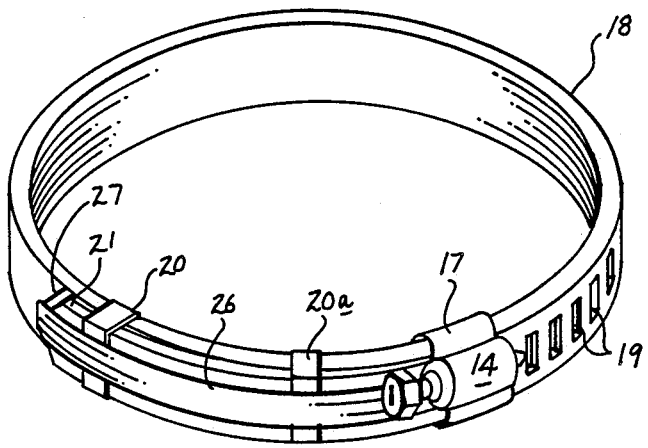
FIG. 6 is an isometric illustration of the second embodiment of the safety hose clamp of the instant invention.

FIG. 5 is illustrative of a second embodiment 11 of the safety hose clamp including the slidably movable loop 20 and a second slidable loop 20a mounted to the guide strap 26 in a spaced radial relationship to the loop 20 of identical configuration to the slidably loop 20, as discussed relative to FIGS. 3 and 4, to maintain an extended portion of the free end of the band 18 against the main body of the band 18 as it extends exteriorly of the housing 14.

Figure 7:
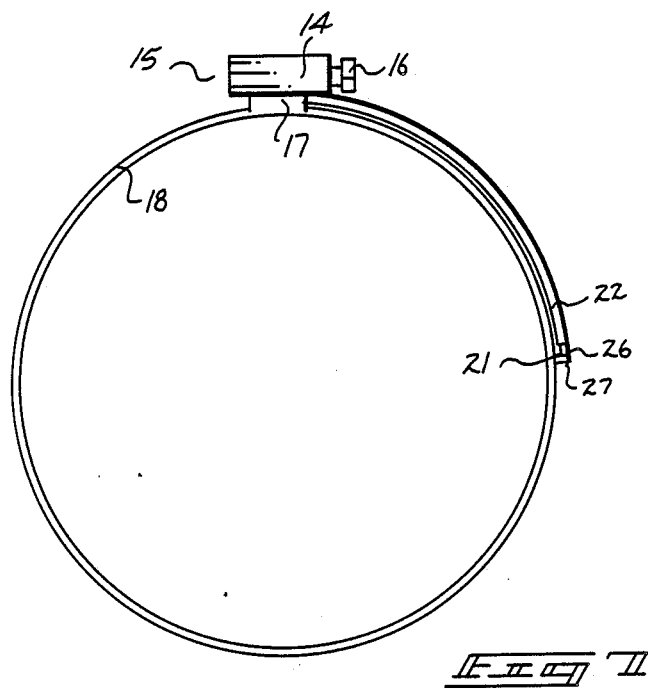
FIG. 7 is an orthographic side view of a third embodiment of the safety hose clamp of the instant invention.
Figure 8:
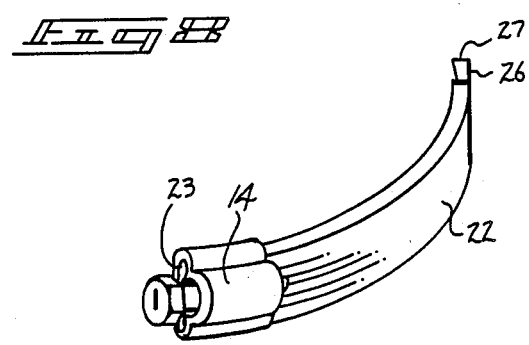
FIG. 8 is an isometric illustration of the arcuate guide structure utilized by the third embodiment of the instant invention.

FIGS. 7 and 8 are illustrative of a third embodiment of the safety hose clamp 12 including an arcuate tubular guide 22 integrally secured to the housing 14, wherein the arcuate guide 22 includes a hollow interior guide portion 23. The hollow interior guide portion 23 is of a cross-sectional configuration complementary to that of the external configuration defined by the band 18, and more particularly by the free end 21 of the band 18 to guide and slidably receive the forward free end 21 in a desired orientation relative to the main body of the band 18, as illustrated in FIG. 8. The free end 21 will be stopped by abutment with the abutment leg 26 spaced from the forward end of the guide 22 when the free end reaches its forward extent beyond the forward end of the guide 22.

FIGS. 9 and 10 are illustrative of a fourth embodiment of the hose clamp 13 wherein the guide includes a modified arcuate guide 24 integrally secured forwardly of the housing 14 and includes an integral guide loop 25 extending at a forward terminal end to receive the band free end 21 therethrough and ensure that the guide 24 is maintained in a secure orientation relative to the band 18 preventing inadvertent twisting or misalignment of the guide 24 relative to the band 18 in use. The abutment leg 26 is an integral part of guide to avoid tightening beyond the designed range of the clamp.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety hose clamp comprising,
   an elongate slotted band body with a rear end and a forward free end, and
   a series of spaced slots directed through the band body, and
   a housing member mounted to the rear end of the band body wherein the housing includes a worm screw rotatably mounted longitudinally therethrough to extend or contract the forward free end of the band longitudinally relative to the housing, and
   a guide means operably associated with the band in the forward free end to secure the forward free end adjacent the band body, and
   wherein the guide means includes at least one loop member slidably mounted, and secured to the housing by a thin strap, relative to the band body and is defined by an enclosed opening of a cross-sectional configuration at least equal to twice the cross-sectional configuration of the band body.

2. A safety hose clamp as set forth in claim 1 wherein the guide means includes a second loop member slidably mounted, and secured to the housing by a thin strap, in surrounding relationship relative to the free end and the band body to ensure securement of an elongate free end adjacent the band body, and an arcuate rigid guide strip is integrally mounted to a forward end of the guide means overlying the band body and includes an abutment leg orthogonally and integrally mounted to a forward end of the guide strip cooperative with the free end to arrest movement of the free end at the abutment leg.

3. A safety hose clamp as set forth in claim 2 wherein the guide means includes an elongate arcuate guide member integrally secured to the housing and extending longitudinally thereof overlying the band body, the arcuate guide member including a cavity therethrough defined by a cross-sectional configuration to slidingly receive the free end therethrough.

4. A safety hose clamp as set forth in claim 3 wherein the guide member further includes a loop integrally secured to a forward terminal end thereof in surrounding relationship to the band body to maintain and align the guide member relative to the band body and slidably receive the free end therethrough.

* * * * *